June 23, 1970 J. P. HESTER 3,516,580
BEVERAGE DECANTER

Filed May 17, 1968 2 Sheets-Sheet 1

INVENTOR.
JOHN P. HESTER
By Huebner & Worrel
ATTORNEYS.

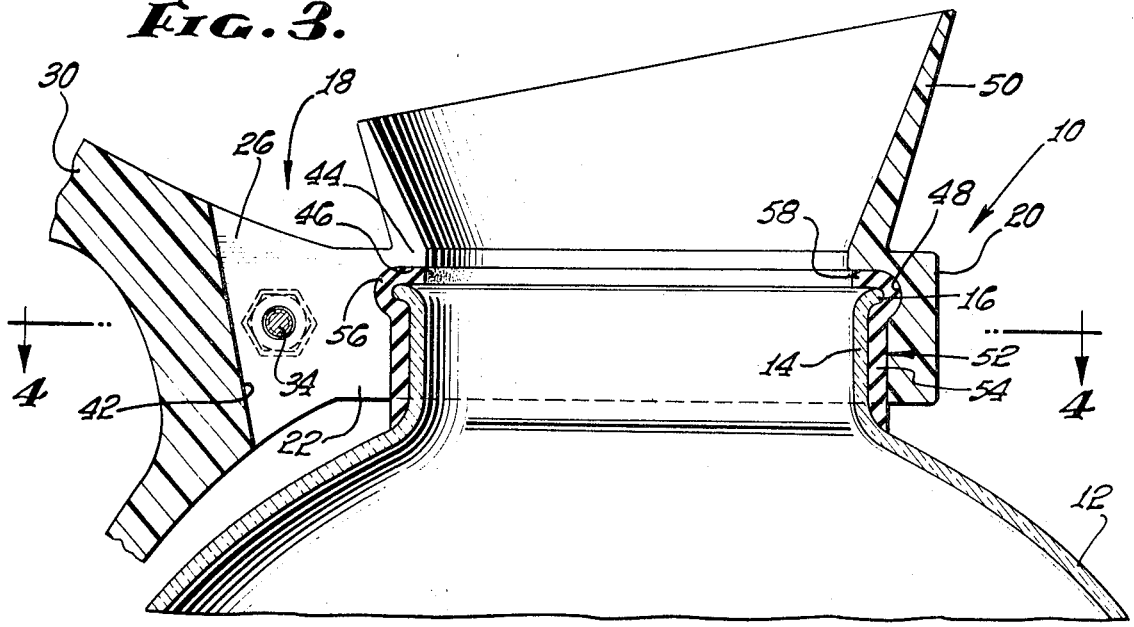
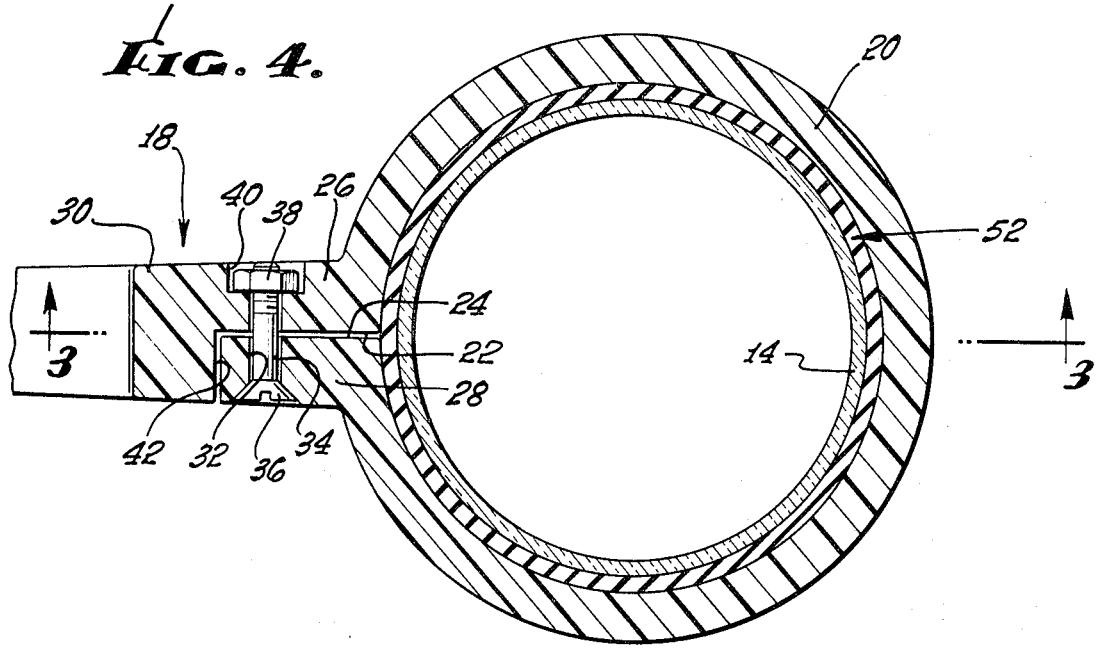

United States Patent Office 3,516,580
Patented June 23, 1970

3,516,580
BEVERAGE DECANTER
John P. Hester, Lakewood, Calif., assignor to
Margaret A. Curtis, North Hollywood, Calif.
Filed May 17, 1968, Ser. No. 729,964
Int. Cl. A47g *19/14;* B65d *5/74;* A47j *45/07*
U.S. Cl. 222—465                                 7 Claims

ABSTRACT OF THE DISCLOSURE

A beverage decanter of the type having a handle and pouring spout assembly attached to the neck of a glass flask. The handle and spout assembly includes a resilient annular attachment collar integral with the handle, the collar being split proximate the handle permitting it to be spread open for engagement around the neck of the flask, with an annular sealing gasket interposed between the collar and neck. The collar is then secured by fasteners means in this operative position about the neck of the flask.

BACKGROUND OF THE INVENTION

Glass beverage decanters are almost universally employed today in restaurants for serving coffee and other hot beverages and for heating water to be used in such beverages, because the level and nature of the contents can be seen at a glance, and also because glass is well recognized as a particularly sanitary material. However, it has been found that when the pouring spout of such a glass beverage decanter is also made of glass, as for example as a continuation of the neck of the decanter, there is high incidence of breakage because the pouring spout will frequently inadvertently strike against the rim of the cup during pouring. Accordingly, most of such glass beverage decanters now employ a durable pouring spout that is made of stainless steel or plastic which is attached to the glass decanter at the neck thereof by means of a metal band clamp which also serves to secure the handle to the decanter. A somewhat intricate rubber gasket is also required in order to effect this connection at the neck of the decanter. While this conventional construction utilizing the metal band clamp has been found to be generally satisfactory in service, it has the disadvantages of being unduly complicated and expensive, as well as being awkward and time-consuming to assemble.

One prior art means which has been suggested for simplifying the attachment of the handle and pouring spout to the glass flask, and for permitting easier and more rapid assembly, is the combination of an externally threaded, split locking sleeve which engages around the neck of the flask under the outwardly projecting bead at the top of the neck, and an internally threaded collar forming a part of a handle and spout assembly, the collar being threadedly engaged over the locking sleeve while the sleeve is held stationary relative to the flask by skirt means on the sleeve which overlays a portion of the body of the flask immediately below the neck. A rubber sealing gasket is also preferably included in this type of device. Such an arrangement is described and claimed in my co-pending application Ser. No. 598,651, filed Dec. 2, 1966, for "Beverage Decanter Construction." While such structure is simpler and less expensive than the conventional arrangement utilizing a metal band clamp, it nevertheless still has the disadvantage of requiring at least two major components for the handle and pouring spout assembly which is attached to the neck of the flask.

Another proposal for avoiding the conventional metal band clamp in this type of apparatus is to provide a unitary, generally rigid handle-collar-pouring spout assembly wherein the collar comprises an unsplit cylindrical sleeve which is slidably engaged over an elongated flask neck and secured to the neck by means of a suitable adhesive bonding agent. While such proposed arrangement has the advantage of the unitary handle-collar-pouring spout construction, the bonding requirement greatly increases the time required for manufacture, resulting in increased manufacturing cost, tends to make performance somewhat unreliable, and necessitates the use of a flask neck which is undesirably long. The only bonding material which has thus far proven sufficiently reliable in practice with this type of structure is an epoxy resin bonding material which requires oven treatment of the assembled apparatus for many hours in order to achieve a reasonably reliable bond which can withstand the heavy weight of liquid in the flask and the high operating temperatures to which such apparatus is normally subjected. Additionally, the conventional flask neck length does not provide sufficient surface area for reliable bonding, and it is generally necessary to provide a flask neck on the order of two to three times the normal length. This undesirably increases the height of the flask, renders pouring more difficult and in general makes the flask less attractive.

SUMMARY OF THE INVENTION

In view of these and other problems in the art, it is an object of the present invention to provide a novel construction for a beverage decanter of the type having a handle and pouring spout assembly attached to the neck of a glass flask, wherein said assembly includes an annular attachment collar that is integral with the handle and split proximate the handle so that it can be spread open for engagement around the neck of the flask below the outwardly projecting bead at the top of the neck, the collar then being constricted and secured about the neck by fastener means engageable between a pair of ears which project rearwardly from the ends of the collar adjacent the split.

Another object of the present invention is to provide a novel beverage decanter arrangement of the character described, wherein the handle, pouring spout and attachment collar are all portions of a unitary plastic structure, both the attachment collar and the pouring spout being split along a generally vertical plane at the rear thereof proximate the handle.

A further object of the present invention is to provide a beverage decanter arrangement of the character described, wherein the handle comprises an integral extension of at least one of the two ears which projects rearwardly from the ends of the split collar and through which the fastener means is engaged to constrict and secure the collar about the neck of the flask.

A further and more general object of the invention is to provide a beverage decanter of the character described which is particularly simple in construction, economical to produce, attractive in appearance, and which provides a positive mechanical interlock between the handle-collar-spout assembly and the neck of the glass flask which eliminates the possibility of accidental separation of the flask from the handle, which could be dangerous if the flask were filled with hot coffee or other beverage.

Further objects and advantages of this invention will appear during the course of the following part of this specification, wherein the details of construction and mode of operation of a preferred embodiment are described with reference to the accompanying drawings, in which:

BRIEF DESCRIPTION OF THE DRAWINGS

FIG. 3 is an enlarged, fragmentary, vertical section taken on the line 3—3 in FIG. 4, illustrating the handle-collar-pouring spout assembly operatively connected to the neck of a glass flask.

FIG. 4 is a horizontal section taken on the line 4—4 in FIG. 3.

DETAILED DESCRIPTION

Figure 1:
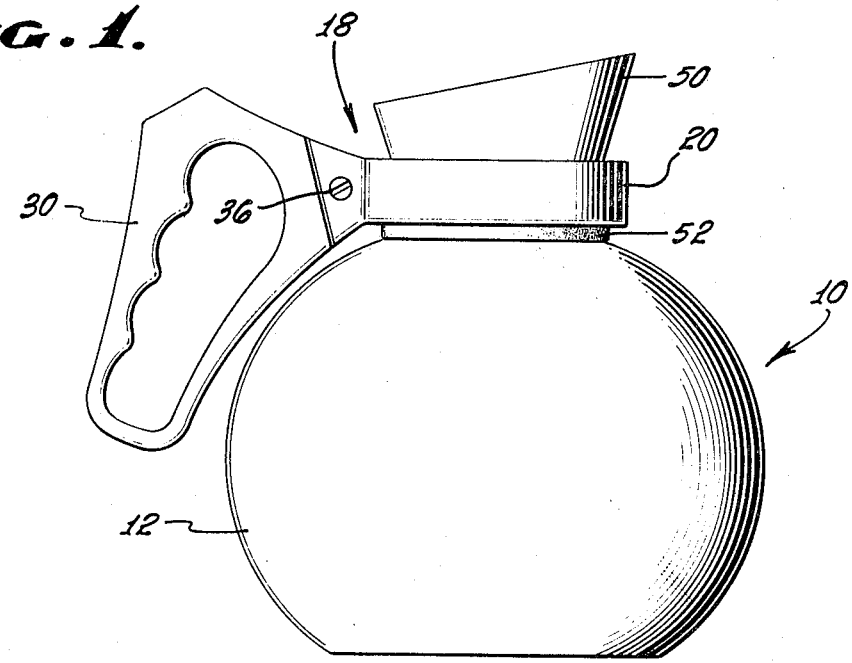
FIG. 1 is a side elevational view of a beverage decanter embodying the present invention.
Figure 2:
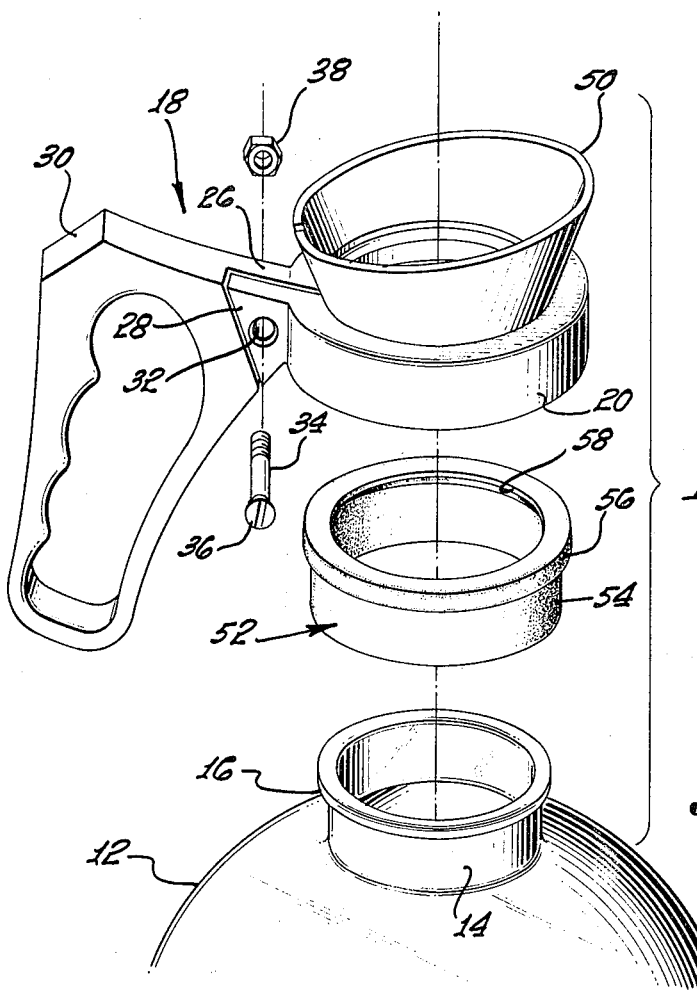
FIG. 2 is an exploded, fragmentary perspective view illustrating the parts of the invention separated from each other, but arranged in vertical, axial alignment preparatory to assembly.

Referring to the drawings, a beverage decanter 10 according to the present invention employs a conventional rounded glass jar or flask 12 having a generally cylindrical neck portion 14 with an out-turned annular bead or lip 16 at its upper rim.

The handle and spout assembly according to the present invention is generally designated 18, and in the presently preferred form thereof which is illustrated in the drawings, this assembly 18 is a unitary molded structure made of any suitable plastic material, as for example polypropylene. The handle and spout assembly 18 includes a generally cylindrical collar 20 which is split along a generally vertical plane proximate the position of the handle, which for reference purposes will hereinafter sometimes be referred to as the rear of the collar. Thus, the split collar 20 has opposed, flat ends 22 and 24 at the split therein. A pair of ears 26 and 28 are integrally formed on the collar 20 immediately adjacent the ends 22 and 24, respectively on opposite sides of the split. In the generally closed or constricted position of the collar 20 as best illustrated in FIG. 4, these ears 26 and 28 are substantially parallel and closely spaced.

In the form of the invention that is illustrated in the drawings, the handle 30 is provided as an integral, rearward extension of the ear 26, the handle extending laterally to the rear of the other ear 28 so that in the constricted or generally closed position of the collar as illustrated in FIG. 4 the sides of the handle 30 will, in general, be continuous with the exposed surfaces of the respective ears 26 and 28.

A transverse bore 32 extends through both ears 26 and 28 to receive a bolt 34 having a head 36 which may be countersunk in the ear 28, and a nut 38 which may be seated in a hexagonal recess 40 in the ear 26.

Rather than considering the two rearward projections 26 and 28 as ears, if desired, the rearward projection 26 may be considered simply as a portion of the handle 30, in which case the handle 30 may be considered as having a notch or recess 42 therein for receiving the ear 28.

The split collar 20 has an inwardly directed flange 44 at the top thereof which defines a downwardly facing shoulder 46 that overlies the bead or lip 16 of the flask neck 14. Immediately adjacent this shoulder 46 the collar 20 is provided with an internal annular groove 48 which preferably has a curved cross-section generally following the curvature of the bead or lip 16 on the flask neck.

In the presently preferred embodiment of the invention, the pouring spout 50 is integrally molded with both the collar 20 and handle 30, flaring upwardly and outwardly from the flange 44 at the top of the collar 20 and being vertically split at its rear along the same general plane on which the collar 20 is split. Alternatively, the pouring spout may comprise a separate metal or plastic spout, which need not be split at the rear, similar to the spout 28a illustrated in FIG. 4 of my said co-pending application Ser. No. 598,651, filed Dec. 2, 1966, for "Beverage Decanter Construction." Such separate pouring spout has an out-turned, generally horizontal flange at the bottom adapted to be engaged downwardly through the collar flange 44 while the collar is spread open, and then engaged under the collar shoulder 46 when the collar is constricted about the neck of the flask.

A resilient annular gasket 52 is preferably employed as a seal and cushion between the collar 20 and the neck portion 14 of the flask. While the gasket 52 illustrated in the drawings is a separate unsplit gasket composed of rubber or other suitable resilient elastomeric material, the gasket may alternatively be integrally bonded on the inside annular surface of the collar 20 so as to form an integral part thereof. The resilient annular gasket 52 includes a generally cylindrical body portion 54 which engages between the cylindrical part of the flask neck 14 and the lower, cylindrical portion of collar 20; an annular upper portion 56 which is curved in cross-section so as to generally fill the space between the bead or lip 16 at the top of the flask neck and the annular groove 48 within the collar 20; and an in-turned flange portion 58 at the top of the gasket 52 which engages between the bead or lip 16 and the downwardly facing shoulder 46 of the collar. In the event that a separate pouring spout is employed similar to that shown in FIG. 4 of my said co-pending application Ser. No. 598,651, then the flange portion 58 of the gasket 52 is engaged between the out-turned flange of such separate pouring spout and the flask bead or lip 16.

Assembly of the beverage decanter 10 is simply and easily accomplished. With the bolt 34 disengaged from the ears 26 and 28, the split collar 20 is spread open sufficiently for engagement over the bead or lip 16 on the flask neck to the operative position illustrated in FIG. 3. The annular gasket 52 may be first applied over the neck portion 14 of the flask before the split collar 20 is thus engaged thereover, or alternatively the annular gasket 52 may be first fitted within the split collar 20 before the collar 20 is thus engaged over the neck of the flask. Then, all that is necessary is to engage the bolt 34 through bore 32 in the ears 26 and 28, and to tighten the nut 38 onto the bolt so as to draw the ears 26 and 28 together and thereby constrict and clinch the split collar 20 about the resilient annular gasket 52 and the neck portion 14 of the flask. The result is a strong and durable connection between handle and flask which will easily withstand the weight of liquid carried in the flask and which will not be weakened by the high temperatures to which such decanters are continually subjected. Additionally, the use of a resilient annular gasket like the gasket 52 provides an excellent liquid seal between the glass of the flask and the pouring spout 50 which is desirable to eliminate any possibility of drippage at the juncture between the neck 14 of the flask and the pouring spout 50.

Although the handle 30 is shown in the drawings as being attached to only one of the ears 26 or 28, with the other ear being recessed in the handle adjacent to the collar, it is to be understood that if desired the entire handle may be split along the same vertical plane as the collar and pouring spout, so that the handle is provided in two separate sections, one a continuation of the ear 26 and the other a continuation of the ear 28. Then, when the bolt 34 is tightened, these two handle sections will be brought together to form a single handle unit.

While it will normally be desirable to employ a bolt similar to the bolt 34 so as to make the handle-collar-spout assembly readily removable from the flask for replacement of the flask in case it becomes broken, if it is desired the entire unit may be made as a disposable unit which cannot be readily disassembled by employing a rivet in place of the bolt 34, or, if desired, permanently welding the ears 26 and 28 together when the collar is clinched about the neck of the flask.

Provision of the split along a generally vertical plane at the rear of the collar and in the region of the handle has several important and surprising advantages. One such advantage is that the ears 26 and 28 for drawing the collar 20 into its constricted position and locking it in this position may, in effect, be formed as portions of the handle structure, which is a necessary lateral projection from the collar. Thus, there is no need for any further projections from the otherwise continuously circular collar 20, and the collar may be made attractive and relatively narrow so as not to in any way interfere with beverage pouring.

Another surprising advantage of having this split at the rear of the collar in the region of the handle is that it is an important factor in permitting an integrally molded pouring spout. With the pouring spout being molded as an integral unit with both the collar and handle, in order for the collar to be spread sufficiently for engagement over the neck of the flask, it is also necessary to spread the pouring spout. Thus, the pouring spout as well as the collar must be split. However, the only place where the pouring spout can be split without likelihood of drippage or spillage is at the rear thereof, proximate the handle.

Thus, it can be seen that provision of the split in the collar along the generally vertical plane in the region of the handle results in an unusual cooperation of all of the major elements of the device. The split at this strategic position permits the collar to be expanded and then constricted for engagement over the neck of the flask, it permits the locking means for the collar to be associated with the handle as a part thereof, and it permits the spreading and constricting of the collar to be accomplished with a similar, cooperative spreading and constricting of the pouring spout without interference with the pouring function thereof. Additionally, the substantial amount of added material in the pouring spout greatly strengthens the collar as the collar is spread apart and then constricted to its closed position, whereby the collar may be made proportionately thinner and less bulky, while still having the required strength in combination with the spout.

The split collar and spout may be molded so that they are constricted or closed in their positions of repose, in which case they are flexed open for engagement of the collar over the neck of the flask; or alternatively they may be molded in the spread or open position, and then merely engaged over the neck of the flask without having to be spread, and then clamped together by the bolt 34 or other suitable fastening means.

While the instant invention has been shown and described herein in what are conceived to be the most practical and preferred embodiments, it is recognized that departures may be made therefrom within the scope of the invention, which is therefore not to be limited to the details disclosed herein.

I claim:

1. A beverage decanter comprising a glass flask having a constricted neck with an outwardly beaded upper edge, a split annular collar composed of generally rigid plastic material capable of limited flexing, said collar being flexible between an expanded position wherein it is slidable over the bead and a contracted position generally circumscribing the neck of the flask, a handle formed with said collar as a unitary plastic structure and extending rearwardly from one end of the collar adjacent to the split therein, an ear integral with said collar and extending rearwardly from the other end of the collar adjacent to the split therein, said handle having a notch in one side thereof, the inner surface of which is a continuation of said one end of the collar, said notch having substantially the same depth as the thickness of said ear and being generally complementary in shape to said ear so as to receive said ear therein, said ear having an inner surface facing said inner surface of the notch and forming a continuation of said other end of the collar, the outwardly facing surface of said ear in said contracted position of the collar being substantially continuous with the corresponding side surface of the handle so that said ear appears generally as a continuation of the handle, fastener means engageable between said handle and said ear to secure said collar in its said contracted position and seat said ear in said notch, and a pouring spout connected to said collar and flaring upwardy therefrom.

2. A beverage decanter as defined in claim 1, wherein said pouring spout is formed as an integral, upwardly flaring extension of said collar, said spout having a split in the rear thereof which is continuous with the split in the collar.

3. A beverage decanter as defined in claim 1, wherein said fastener means is removably engageable between said handle and said ear, whereby the assembly including said collar, handle and pouring spout is removably attachable to the flask.

4. A beverage decanter as defined in claim 1, which includes annular sealing means disposed between the collar and neck.

5. A beverage decanter as defined in claim 4, wherein said annular sealing means comprises a separate ring of resilient sealing material interposed between the collar and neck.

6. A beverage decanter as defined in claim 1, wherein said collar has a generally cylindrical lower portion engageable about the neck of the flask below the bead, an upper portion in the form of a radially inwardly directed flange which overlies the bead, and an annular groove in the inner wall thereof adjacent to said flange for accommodating the bead.

7. A beverage decanter as defined in claim 6, wherein said annular sealing means comprises a gasket having a generally cylindrical body portion engageable between said lower portion of the collar and the neck of the flask, an in-turned flange at the top thereof engageable between said collar flange and the bead, and a portion intermediate said body portion and said in-turned flange which extends around the bead and into said groove.

References Cited

UNITED STATES PATENTS

| 2,495,688 | 1/1950 | Blakeslee | 294—31.2 |
| 2,950,843 | 8/1960 | Connor | 222—465 X |
| 3,114,484 | 12/1963 | Serio | 222—465 |

FOREIGN PATENTS

| 116,788 | 6/1918 | Great Britain. |

SAMUEL F. COLEMAN, Primary Examiner

H. S. LANE, Assistant Examiner

U.S. Cl. X.R.

222—567; 294—31.2